United States Patent
Hagiwara et al.

[11] Patent Number: 6,118,387
[45] Date of Patent: Sep. 12, 2000

[54] COUNTER

[75] Inventors: Katsumi Hagiwara, Kasukabe; Toshio Ohata, Tsukuba, both of Japan

[73] Assignee: SMC Kabushiki Kaisha, Tokyo, Japan

[21] Appl. No.: 09/122,113

[22] Filed: Jul. 24, 1998

[51] Int. Cl.[7] ........................................ H04Q 5/22

[52] U.S. Cl. .................. 340/825.52; 340/825.65; 377/16; 377/27

[58] Field of Search .................. 340/825.52, 825.66, 340/825.65; 377/12, 37, 16, 27, 39, 28

[56] References Cited

U.S. PATENT DOCUMENTS

| | | | |
|---|---|---|---|
| 4,612,655 | 9/1986 | Nakamura | 377/16 |
| 6,002,737 | 12/1999 | Devanagundy | 377/20 |
| 6,021,171 | 2/2000 | Andrews | 377/16 |

Primary Examiner—Brian Zimmerman
Assistant Examiner—Anthony A. Asongwed
Attorney, Agent, or Firm—Oblon, Spivak, McClelland, Maier & Neustadt, P.C.

[57] ABSTRACT

When a cylinder is urged to displace a piston rod, and a pulse signal is inputted into a counter from an encoder, then the number of pulses of the pulse signal is counted by a counting section. A time-measuring section starts measurement for the elapsed time upon the start of operation of the cylinder. When the pulse signal is inputted, the elapsed time is reset. When the displacement of the piston rod is stopped, the pulse signal is not inputted. The elapsed time is increased to make coincidence with a predetermined preset time to output, to a control unit, a preset time elapse signal indicating this fact. At this time, the preset count value is compared with the count value of the pulse signal counted by the counting section. If the both are coincident with each other, a coincidence signal indicating this fact is outputted to the control unit. Accordingly, it is possible for the control unit to detect the stop of the cylinder and detect the displacement position of the piston rod at this time.

8 Claims, 9 Drawing Sheets

FIG. 4

| | MEMORY 114 | 116 |
|---|---|---|
| 112 | | |
| ADDRESS $a_1$ | PRESET COUNT VALUE $n_1$ | PRESET ALLOWABLE VALUE $b_1$ |
| ADDRESS $a_2$ | PRESET COUNT VALUE $n_2$ | PRESET ALLOWABLE VALUE $b_2$ |
| ADDRESS $a_3$ | PRESET COUNT VALUE $n_3$ | PRESET ALLOWABLE VALUE $b_3$ |
| ••••• | ••••• | ••••• |
| ADDRESS $a_{31}$ | PRESET COUNT VALUE $n_{31}$ | PRESET ALLOWABLE VALUE $b_{31}$ |
| ADDRESS $a_T$ | PRESET TIME $T_1$ | |

98

118

6,118,387

1

COUNTER

BACKGROUND OF THE INVENTION

1. Field of the Invention

The present invention relates to a counter for counting the number of pulses of a pulse signal outputted from an encoder, comparing the count value with a preset count value, and outputting a coincidence signal if the count value is substantially coincident with the preset count value.

2. Description of the Related Art

A large number of actuators such as cylinders have been hitherto used, for example, in production steps in order to transfer the workpiece. For example, FIG. 8 shows a production line 12 for transferring a workpiece 10 upwardly, and thereafter transferring the workpiece 10 in the horizontal direction. In this case, the production line 12 comprises a cylinder 14 and a cylinder 16. The cylinder 14 has a piston rod 18 which is displaceable in the vertical direction. A transport table 20 is secured to an end of the piston rod 18.

The cylinder 16 has a piston rod 22 which is displaceable in the horizontal direction. A pressing member 24 is secured to an end of the piston rod 22. The production line 12 has a table member 25 to which the pressing member 24 is approachable. Compressed air is supplied from a compressed air supply source 30 through valves 26, 28 to the cylinders 14, 16 respectively. The valves 26, 28 are controlled by a control unit 32. The cylinder 14 is provided with an encoder 31. The number of pulses of a pulse signal outputted from the encoder 31 is counted by the counter 33. Thus, the displacement position of the cylinder 14 is detected. Further, the control unit 32 contains a timer 34.

The workpiece 10 is transported by the production line 12 as follows. That is, when the workpiece 10 is placed on the transport table 20, the control unit 32 operates the valve 26 to introduce compressed air into the cylinder 14 so that the transport table 20 is lifted upwardly together with the workpiece 10.

During this process, the control unit 32 measures the time from the start of the operation of the cylinder 14 by the aid of the timer 34 provided separately from the counter 33. It is assumed that the operation of the cylinder 14 is completed at a point of time at which the measured time becomes the previously established predetermined preset time as shown in FIG. 9. On this assumption, the valve 28 is controlled to energize the cylinder 16. Accordingly, the pressing member 24 of the cylinder 16 is displaced to transfer the workpiece 10 from the transport table 20 to the table member 25.

However, in the case of the production line 12 as described above, in order to avoid the fear of occurrence of malfunction due to, for example, dispersion of the operation time of the cylinder 14, the predetermined preset time is set to contain the margin time or float. For this reason, both of the cylinders 14, 14 are in a stopped state during the margin time, giving rise to waste time. Therefore, a long period of time is required to transport the workpiece 10, and a problem arises in that the efficiency is lowered.

For example, if the cylinder 14 is abnormally operated in any manner, and the preset period has elapsed in a state in which the operation of the cylinder 14 is not stopped as shown in FIG. 10, then the cylinder 16 is operated although the margin time is taken into consideration. As a result, it is feared that the workpiece 10 is broken, or the cylinders 14, 16 themselves are damaged.

SUMMARY OF THE INVENTION

A general object of the present invention is to provide a counter which is capable of outputting a signal based on a number of pulses of a pulse signal outputted from an encoder, and which is capable of outputting a signal to reduce waste time, making it possible to preferably control an actuator or the like.

A principal object of the present invention is to provide a counter which is capable of outputting a signal to indicate a state in which an actuator is operated, and a signal to indicate a state in which the actuator is completely stopped.

Another object of the present invention is to provide a counter which is capable of outputting a signal to indicate a plurality of states in which an actuator is operated, and a signal to indicate a state in which the actuator is completely stopped.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 shows a block diagram illustrating a memory used for the counter shown in FIG. 2;

DESCRIPTION OF THE PREFERRED EMBODIMENTS

The counter according to the present invention is embodied by a preferred embodiment, which will be explained in detail below with reference to the accompanying drawings.

Figure 1:
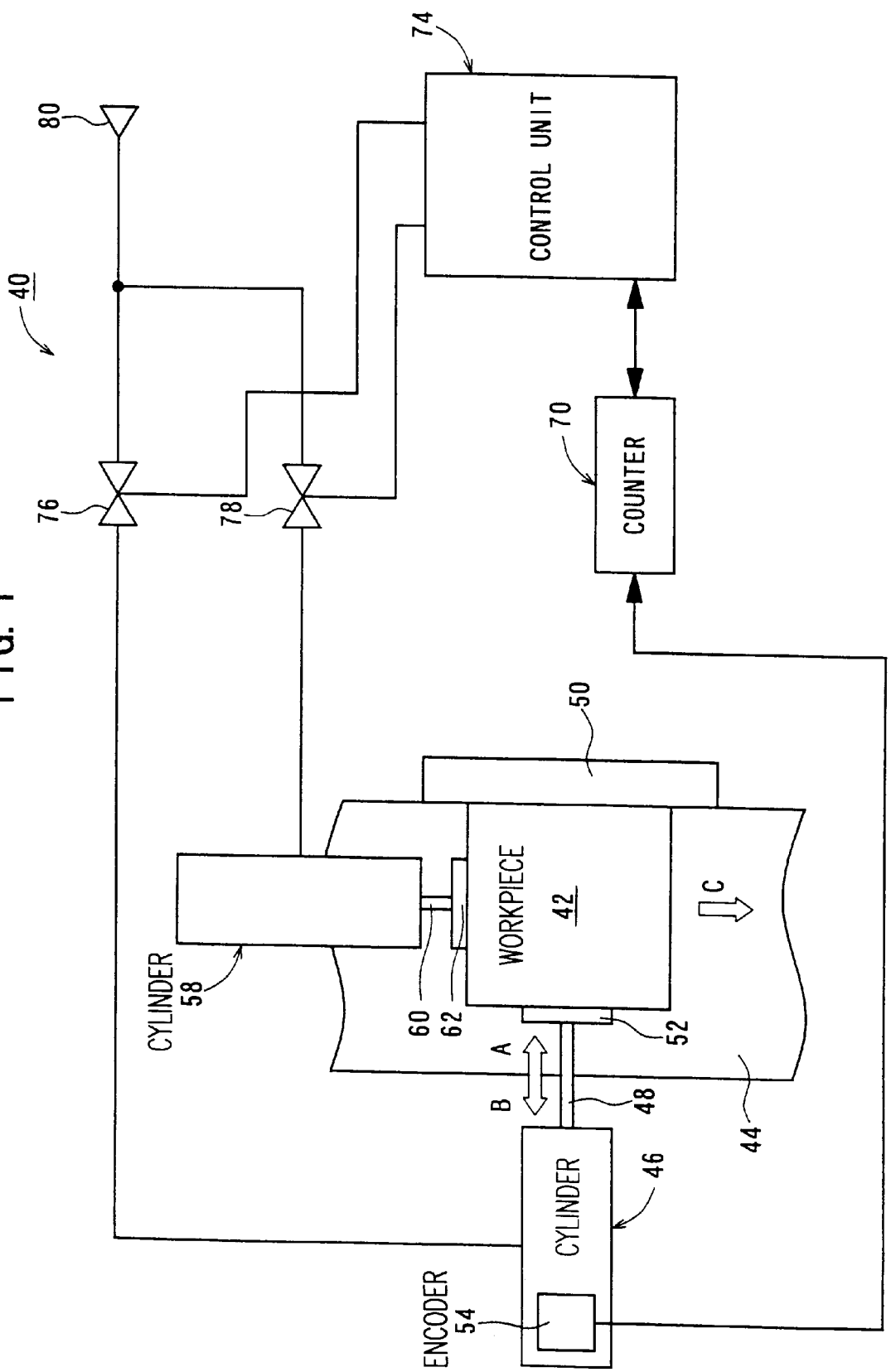
FIG. 1 shows a block diagram illustrating a production line in which a counter according to an embodiment of the present invention is used.

In FIG. 1, reference numeral 40 indicates a production line in which the counter according to the embodiment of the present invention is used. The production line 40 is a line in which the width of a workpiece 42 is measured, the type or model of the workpiece 42 is judged, and the workpiece 42 is transported. The production line 40 comprises a working bench 44 for placing the workpiece 42 thereon. A cylinder 46, which serves as an actuator, is arranged adjacent to the working bench 44. A piston rod 48, which is a displacement member to be displaced by the cylinder 46, is displaceable toward a positioning member 50 which is secured to the working bench 44 and against which the workpiece 42 is capable of making abutment. A pressing member 52 for pressing the workpiece 42 is secured to an end of the piston rod 48. The cylinder 46 is provided with an encoder 54. The encoder 54 generates pulse signals in accordance with the displacement of the piston rod 48.

The working bench 44 is provided with a cylinder 58. The cylinder 58 has its piston rod 60 which is displaceable in a direction perpendicular to the piston rod 48 of the cylinder 46. A pressing member 62 is secured to an end of the piston rod 60.

The encoder 54 of the cylinder 46 is connected to a counter 70 according to the embodiment of the present invention. The counter 70 is connected to a control unit 74. Valves 76, 78 are connected to the control unit 74. The valves 76, 78 control compressed air supplied from a compressed air supply source 80 to the cylinders 46, 58.

Next, the counter 70 according to the embodiment of the present invention will be explained with reference to FIG. 2.

Figure 5:
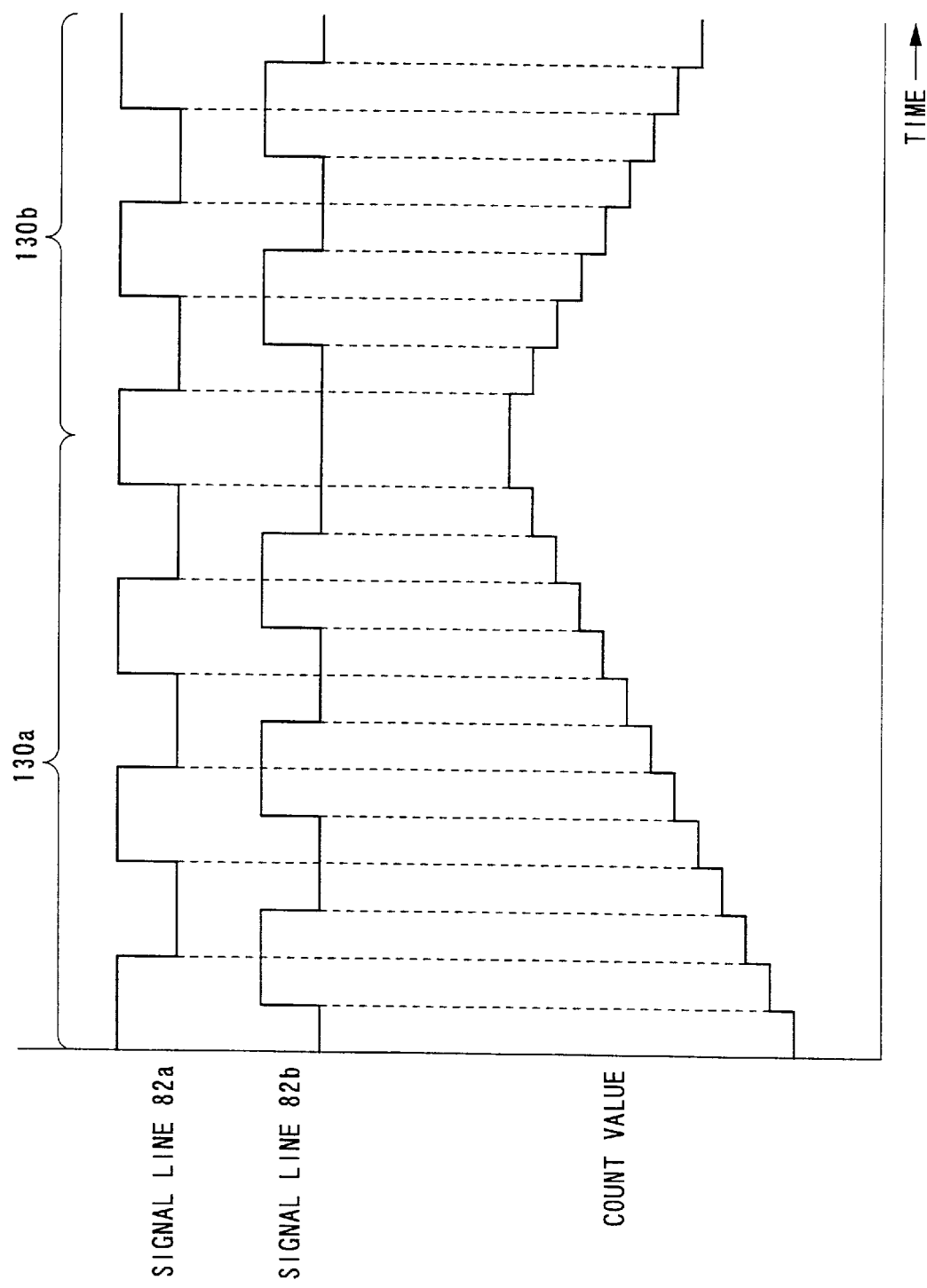
FIG. 5 shows a timing chart illustrating signals of an encoder to be inputted into the counter shown in FIG. 2.

Pulse signals are inputted into the counter 70 from the encoder 54 through two signal lines 82a, 82b. The signal lines 82a, 82b are electrically isolated by the aid of a photocoupler 84. When the piston rod 48 is displaced in the direction of the arrow A, the phase of the pulse signal concerning the signal line 82a is earlier by 90° than the phase of the pulse signal concerning the signal line 82b as shown in a region 130a in FIG. 5. When the piston rod 48 is displaced in the direction of the arrow B, the phase of the pulse signal concerning the signal line 82a is later by 90° than the phase of the pulse signal concerning the signal line 82b as shown in a region 130b. Accordingly, it is possible to detect whether the piston rod 48 is displaced in either the direction of the arrow A or the arrow B shown in FIG. 1, by using the pulse signals supplied through the two signal lines 82a, 82b. The output of the photocoupler 84 is converted into a four-fold multiplication pulse signal by a multiplying section 86, and the obtained signal is inputted into a counting section 88. The number of pulses of the pulse signal is counted by the counting section 88, and an obtained result is inputted into CPU 90 as a count value n.

Figure 3:
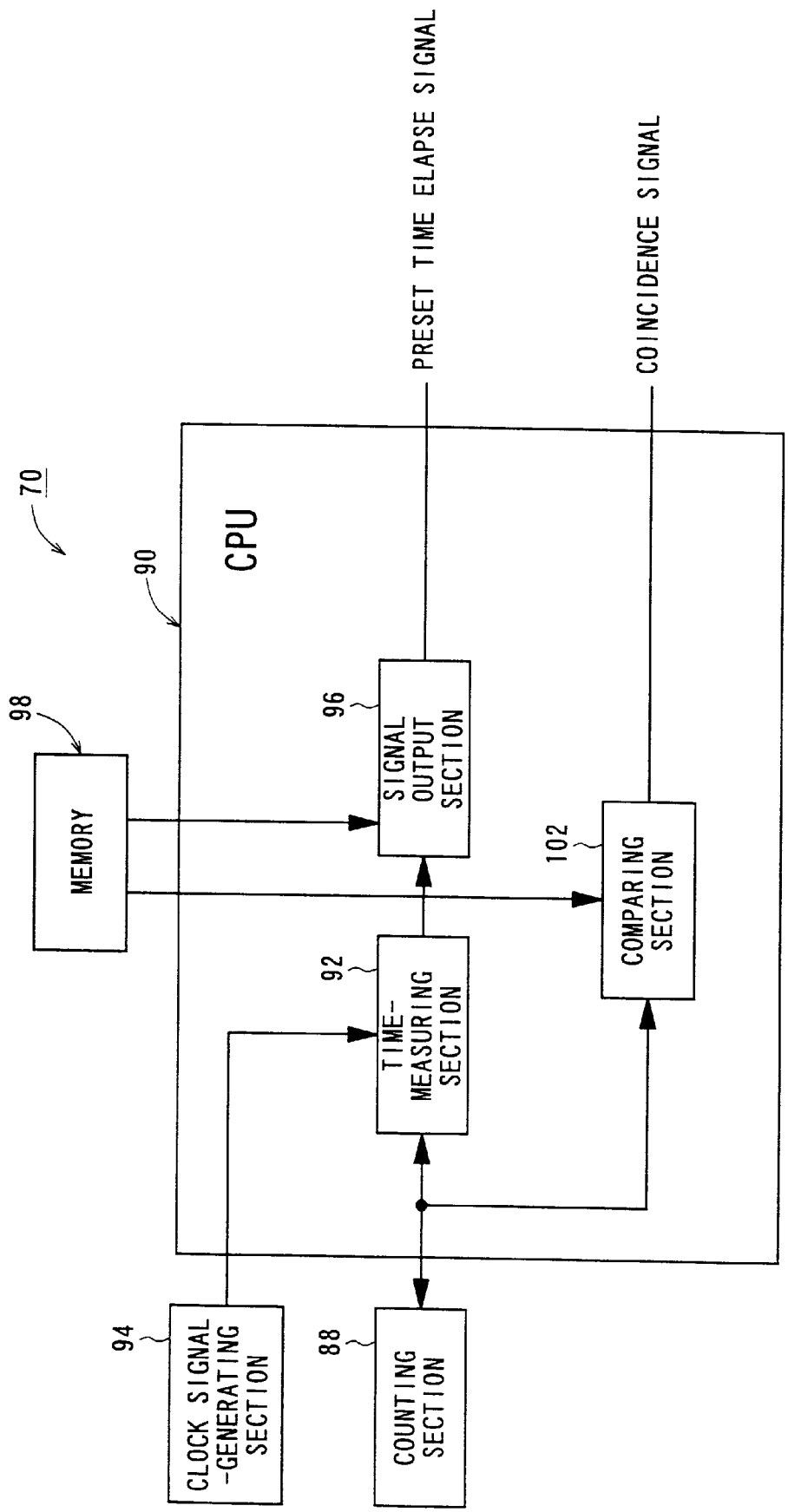
FIG. 3 shows a block diagram illustrating CPU used for the counter shown in FIG. 2.

As shown in FIG. 3, CPU 90 is provided with a time-measuring section 92 into which the output signal from the counting section 88 is inputted. The time-measuring section 92 measures the elapsed time t from the input of the output signal of the counting section 88 by counting the clock signal inputted from a clock signal-generating section 94 which is connected to CPU 90. The count value of the clock signal, which is obtained by the time-measuring section 92 is reset every time when the output signal is inputted from the counting section 88. The elapsed time t, which is measured by the time-measuring section 92, is inputted into a signal output section 96. If the elapsed time t is coincident with the preset time $T_1$ which is stored in a memory 98 connected to CPU 90, the signal output section 96 generates a preset time elapse signal which indicates the coincidence. The signal is outputted through a photocoupler 100 to pass through a signal line 101 to the control unit 74.

On the other hand, the output signal from the counting section 88 is further inputted into a comparing section 102. The comparing section 102 compares the count value n counted by the counting section 88, with a plurality of preset count values $n_1$ to $n_{31}$ which are stored in a memory 98. A result of comparison is outputted through a photocoupler 106 to pass through five signal lines 107 to the control unit 74.

As shown in FIG. 4, the memory 98 for storing the preset count values $n_1$ to $n_{31}$ comprises an address-storing section 112, a preset count value-storing section 114, a preset allowable value-storing section 116, and a preset time-storing section 118 for storing the preset count values $n_1$ to $n_{31}$, preset allowable values $b_1$ to $b_{31}$, and preset time $T_1$.

Figure 2:
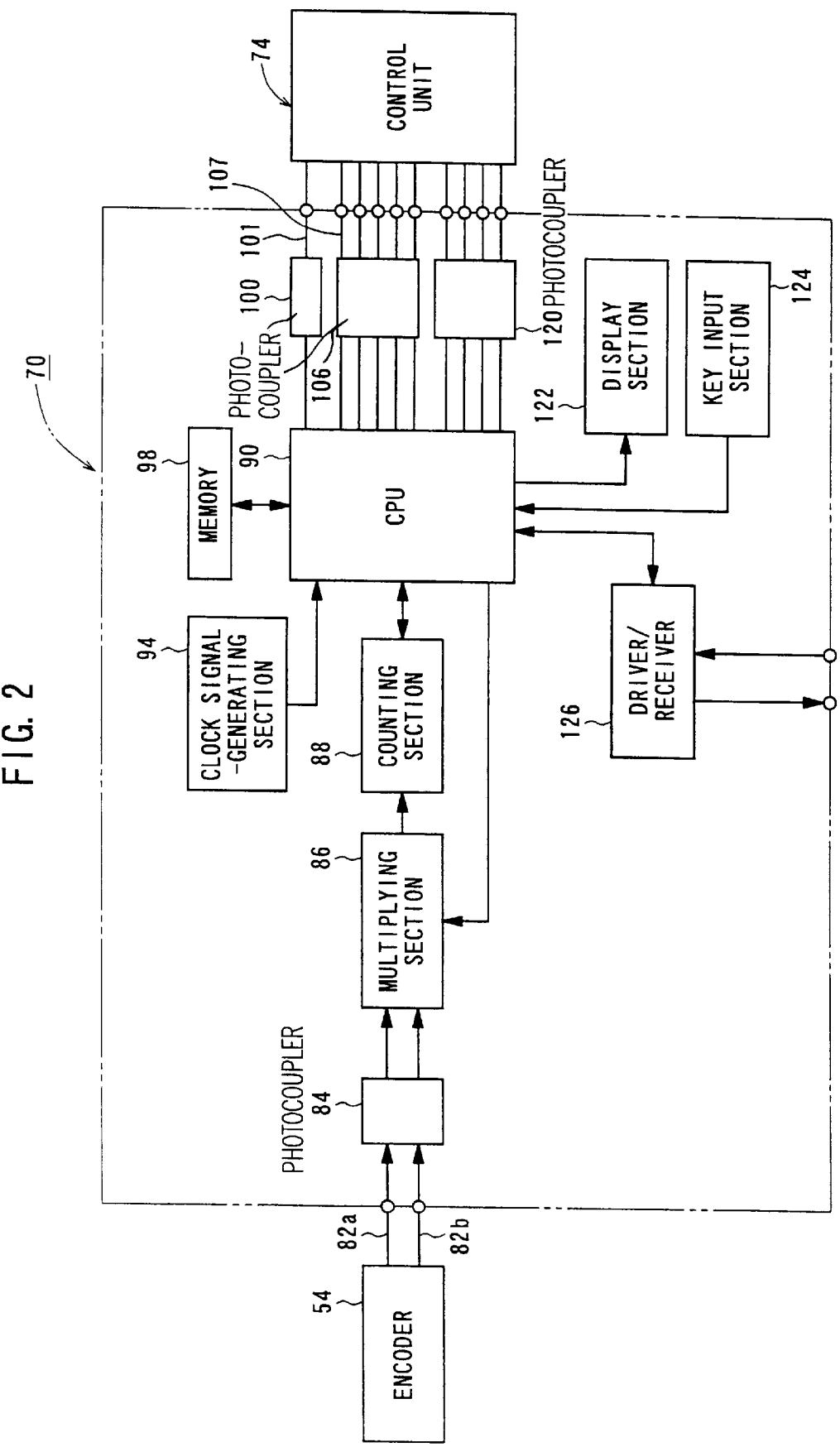
FIG. 2 shows a block diagram illustrating the counter according to the embodiment of the present invention.

As shown in FIG. 2, a photocoupler 120 is connected to CPU 90. A control signal is inputted into the photocoupler 120 from the control unit 74. A display section 122 and a key input section 124 are connected to CPU 90. Preset parameters such as the preset count values $n_1$ to $n_{31}$ are inputted from the key input section 124. Display is made on the display section 122, for example, for the preset contents and the elapsed time t. CPU is further connected with a driver/receiver 126 which is connectable to an unillustrated computer. The counter 70 can be externally controlled by the computer.

Figure 6:
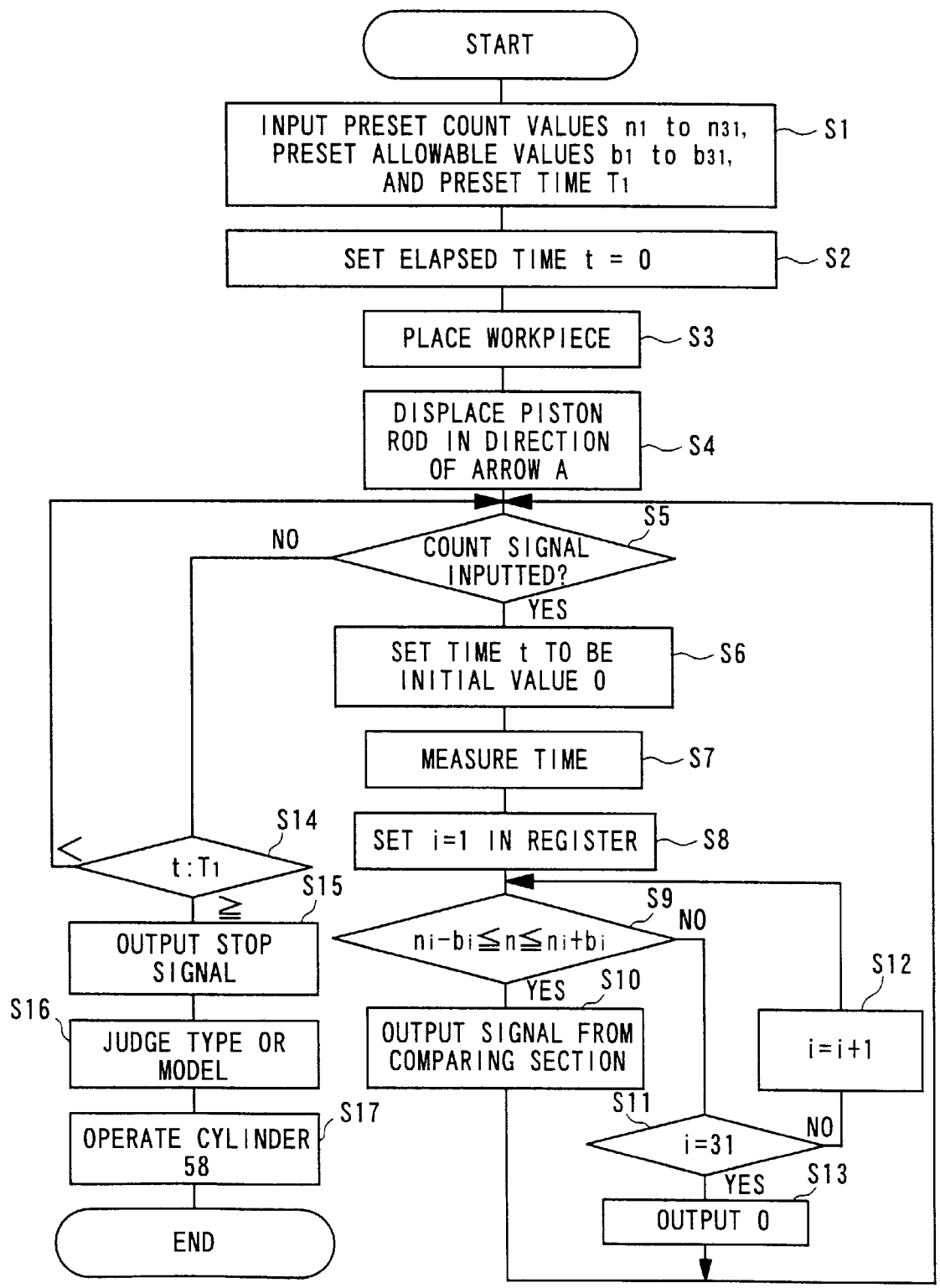
FIG. 6 shows a flow chart illustrating the operation of the counter shown in FIG. 2.

The counter 70 according to the embodiment of the present invention is basically constructed as described above. Next, its operation will be explained on the basis of a flow chart shown in FIG. 6.

The preset count values $n_1$ to $n_{31}$, the preset allowable values $b_1$ to $b_{31}$, and the preset time $T_1$ are previously inputted from the key input section 124 to store them in the preset count value-storing section 114, the preset allowable value-storing section 116, and the preset time-storing section 118 of the memory 98 corresponding to the respective addresses $a_1$ to $a_{31}$ and $a_T$ (step S1, see FIG. 4). Subsequently, the elapsed time t is initially set to be zero (step S2).

When the workpiece 42 is placed on the working bench 44 (step S3, see FIG. 1), the control unit 74 controls the valve 76 to introduce compressed air from the compressed air supply source 80 into the cylinder 46. Accordingly, the piston rod 48 is displaced in the direction of the arrow A (step S4).

Figure 7:
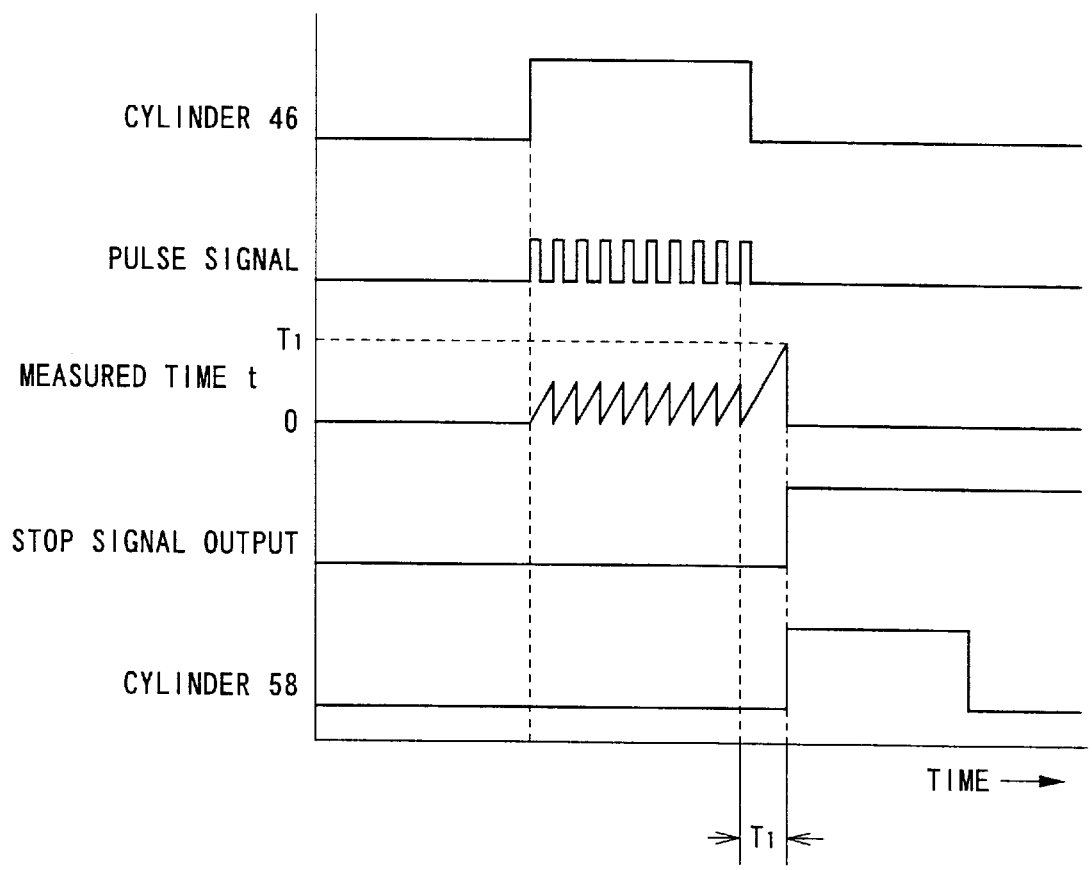
FIG. 7 shows a timing chart concerning the transport of a workpiece by using the production line shown in FIG. 1.
Figure 8:
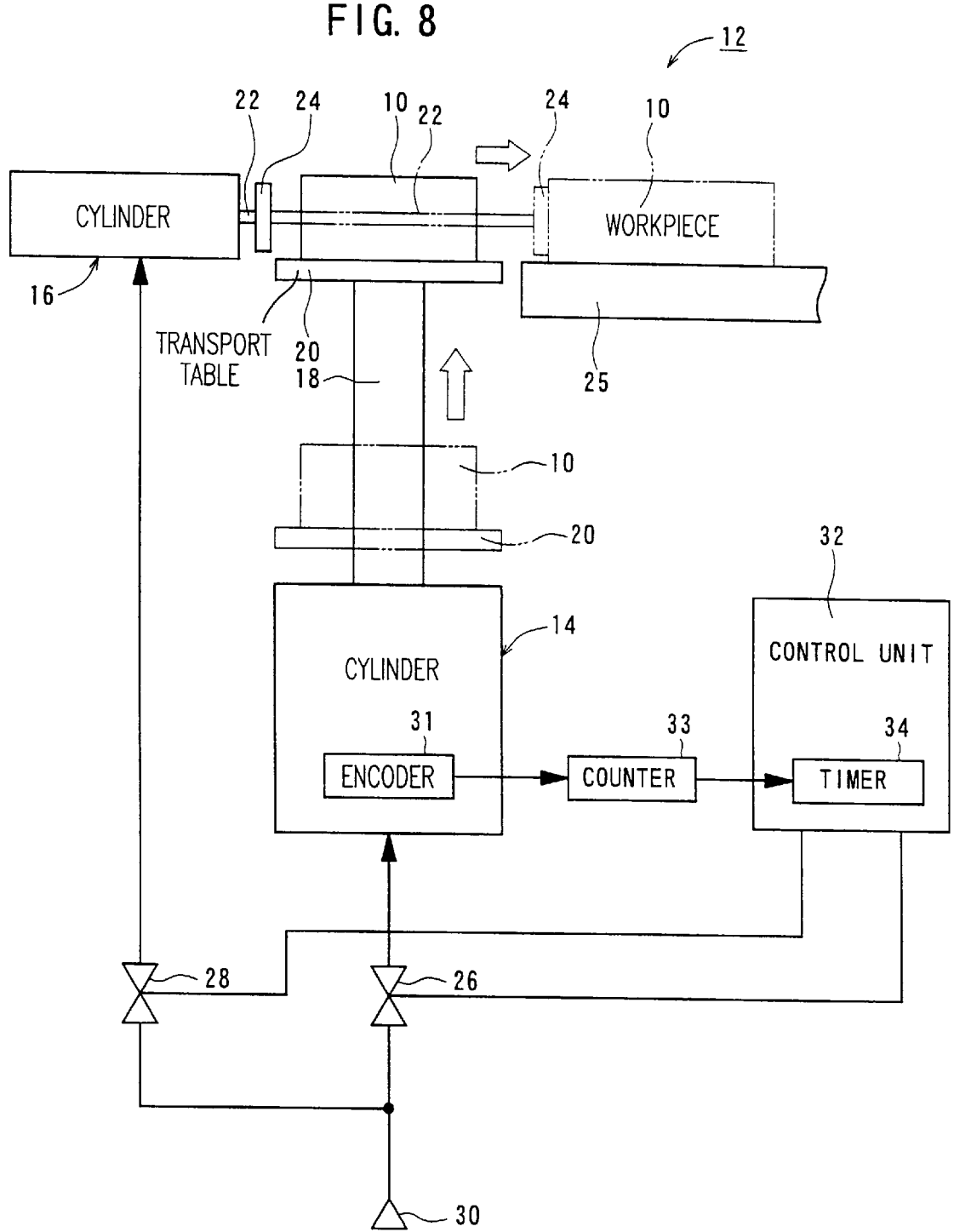
FIG. 8 shows a block diagram of a production line in which a counter concerning the conventional technique is used.
Figure 9:
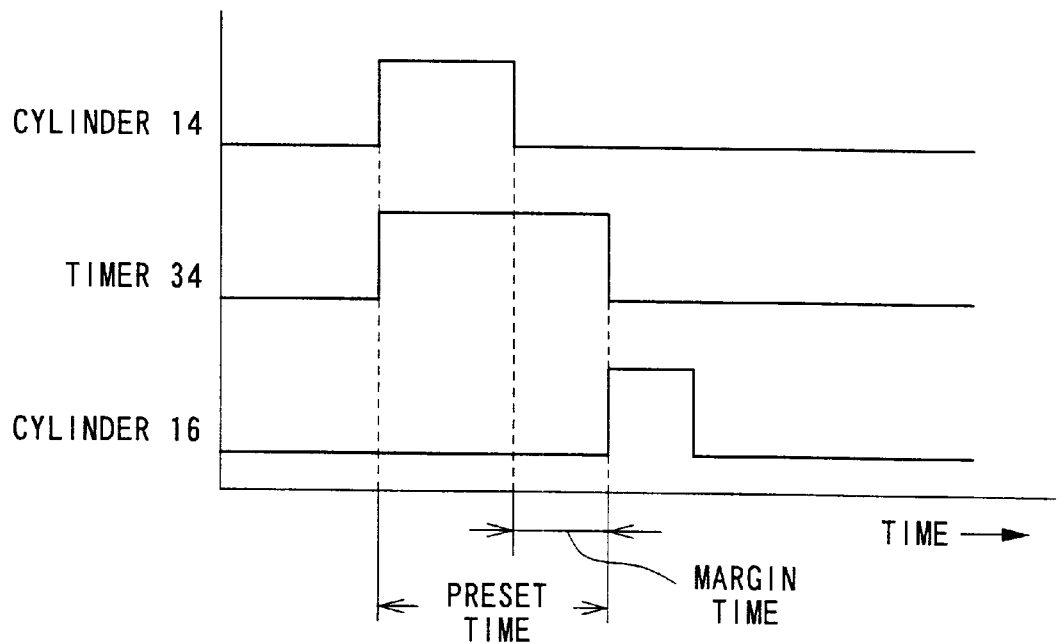
FIG. 9 shows a timing chart concerning the transport of a workpiece by using the production line shown in FIG. 8.
Figure 10:
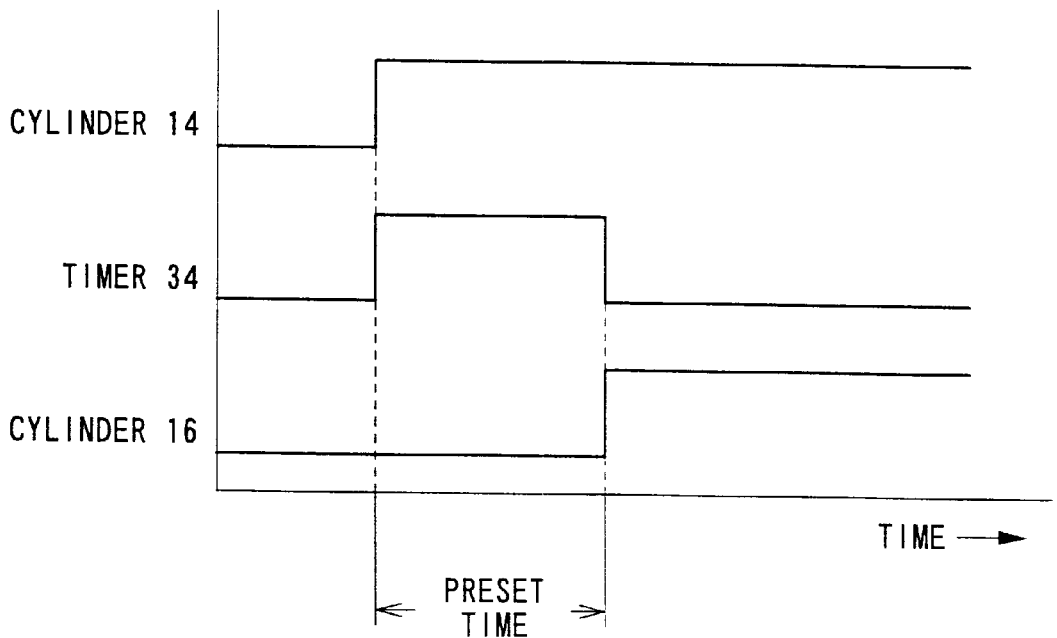
FIG. 10 shows a timing chart concerning the transport of a workpiece by using the production line shown in FIG. 8, in which, for example, a cylinder is abnormally operated.

The encoder 54 of the cylinder 46 generates pulse signals in accordance with the displacement of the piston rod 48. In this process, the phase of the pulse signal concerning the signal line 82a is earlier by 90° then the phase of the pulse signal concerning the signal line 82b. Therefore, the counting section 88 is set to be in a state to make increment for the count value n. The pulse signal is subjected to four-fold multiplication by the multiplying section 86 to be inputted into the counting section 88. The counting section 88 counts the number of four-fold multiplied pulse signals, and the count signal is outputted to CPU 90. CPU 90 judges whether or not the input of the count signal is given from the counting section 88 (step S5). If the input is given, the elapsed time t is reset to be zero (step S6, see FIG. 7). After that, the time-measuring section 92 is used to count the clock signal inputted from the clock signal-generating section 94 to measure the elapsed time t (step S7).

On the other hand, the count value n counted by the counting section 88 is inputted into the comparing section 102 of CPU 90. The comparing section 102 compares the count value n with the preset count values $n_1$ to $n_{31}$. This process will be explained in detail below. At first, a value i=1 is set in the register of CPU 90 (step S8). Subsequently, the preset count value $n_i$ (preset count value $n_1$ in this embodiment) and the preset allowable value $b_i$ (preset allowable value $b_1$ in this embodiment) at the address $a_i$ (address $a_1$ in this embodiment) corresponding to the value i of the register are read from the memory 98. A value, which is obtained by adding or subtracting the preset allowable value $b_i$ with respect to the preset count value $n_i$, is compared with the count value n (step S9). If there is given:

$$n_i - b_i \leq n \leq n_i + b_i$$

then the comparing section 102 outputs, as the coincidence signal, a signal which indicates the register value i at this time after conversion into binary code (step S10). That is, for example, assuming that i=5 is provided, if there is given:

$$n_5 - b_5 \leq n \leq n_5 + b_5$$

then the binary code corresponding to the value i=5 set in the register is 00101. The binary code is outputted as the coincidence signal to the control unit 74 from the comparing section 102 through the photocoupler 106 by using the five signal lines 107. Accordingly, it is possible for the control unit 74 to detect the coincidence within the range concerning the preset count value $n_5$ and the preset allowable value $b_5$, of those concerning the thirty-one preset count values $n_1$ to $n_{31}$. Thus, the routine returns to the step S5.

On the other hand, in the step S9, if there is not given:

$$n_i - b_i \leq n \leq n_i + b_i$$

then CPU 90 judges whether or not the register value i is 31 (step S11). If there is not given i=31, addition is made for the register value i by 1 (step S12). The routine returns to the step S9 to read, from the memory 98, the preset count value $n_i$ and the preset allowable value $b_i$ corresponding to the register value i again so that the count value n is compared with a value obtained by adding or subtracting the preset allowable value $b_i$ with respect to the preset count value $n_i$.

When the count value n is compared with the thirty-one preset count values $n_1$ to $n_{31}$, if the count value n is not coincident with any one of the preset count values $n_1$ to $n_{31}$, then a binary code representing zero is outputted to the control unit 74 (step S13). Accordingly, it is possible for the control unit 74 to detect that the count value n is not coincident with any one of the thirty-one preset count values $n_1$ to $n_{31}$. Thus, the routine returns to the step S5.

When the count signal is inputted from the counting section 88 into the time-measuring section 92 (step S5), there is given the elapsed time t=0 to measure the elapsed time t again. Further, the comparing section 102 is used to compare the count value n with the preset count values $n_1$ to $n_{31}$.

When the piston rod 48 is further displaced, then the workpiece 42 abuts against the positioning member 50, and the displacement of the piston rod 48 is stopped. Accordingly, the pulse signal is not inputted from the encoder 54 into the counter 70. It is assumed that there is no input of the count signal in the step S5. The elapsed time t, which is measured by the time-measuring section 92, is compared with the preset time $T_1$ which is stored in the memory 98 (step S14). If the elapsed time t does not arrive at the preset time $T_1$, then the routine returns to the step S5 again to judge whether or not the input of the count signal is given.

If the elapsed time t is not less than the preset time $T_1$ in the step S14, the control unit 74 controls the valve 76 to stop the cylinder 46. The preset time elapse signal is outputted to the control unit 74 from the signal output section 96 through the photocoupler 100 (step S15, see FIG. 7).

On the other hand, CPU 90 outputs the count value n corresponding to the displacement amount of the piston rod 48 and any of the addresses $a_1$ to $a_{31}$ of the preset count values $n_1$ to $n_{31}$ which makes coincidence within the range of the preset allowable values $b_1$ to $b_{31}$. It is possible for the control unit 74 to detect the displacement amount of the piston rod 48. Therefore, it is possible for the control unit 74 to detect the width of the workpiece 42. The type or model of the workpiece 42 is judged on the basis of the width (step S16).

The control unit 74 urges the cylinder 58 to displace the piston rod 60 in the direction of the arrow C and displace the workpiece 42 in the direction of the arrow C (step S17). Accordingly, the workpiece 42 is transported to the next step.

If the cylinder 46 or the workpiece 42 is abnormally operated in any manner, for example, if the piston rod 48 is continuously displaced, then the pulse signal is generated from the encoder 54 as long as the piston rod 48 is displaced. Accordingly, the elapsed time t, which is measured by the time-measuring section 92, is continuously rest, and it never becomes not less than the preset time $T_1$. It is possible for the control unit 74 to detect that the operation of the cylinder 46 is not completed. During this period, the cylinder 58 is not operated. Therefore, for example, there is no fear of damage of the workpiece 42 and the cylinders 46, 58, which would be otherwise caused by the operation of the cylinder 58 before the stop of the cylinder 46.

The counter 70 according to the embodiment of the present invention waits for the predetermined preset time $T_1$ since the cylinder 46 is stopped and the pulse signal is not inputted from the encoder 54. After that, the cylinder 58 for the next step is operated. Therefore, it is unnecessary to separately provide a sensor for detecting the stop of the cylinder 46. Further, it is possible to shorten the time required to perform one step, making it possible to improve the production efficiency.

A plurality of displacement positions of the piston rod 48 can be detected by comparing the count value n with the plurality of preset count values $n_1$ to $n_{31}$. The coincidence signal corresponding to the position is outputted to the control unit 74 by using the binary signal. Therefore, it is possible to decrease the number of signal lines 107.

Further, it is possible to absorb the error of the displacement amount of the piston rod 48 due to any error of the width of the workpiece 42 or the like, by setting the preset allowable values $b_1$ to $b_{31}$ for the preset count values $n_1$ to $n_{31}$.

In the counter 70 according to the embodiment of the present invention, the coincidence signal is outputted to the signal line 107 by using the binary code. However, the signal lines 107 may be provided in a number corresponding to the number of the preset count values $n_1$ to $n_{31}$. When the count value n is coincident with one of the preset count values $n_1$ to $n_{31}$, the signal may be outputted to the control unit 74 from the signal lines 107 corresponding to the respective preset count values $n_1$ to $n_{31}$. Alternatively, for example, five of the preset count values $n_1$ to $n_{31}$ may be grouped into one bank to set seven banks in total. A bank is selected by selecting the necessary bank by using the control unit 74. A result, which is obtained by comparing the count value n with the five of the preset count values $n_1$ to $n_{31}$ set in the selected bank, may be outputted from the signal lines 107.

The pulse signal outputted from the encoder 54 is the signal having the phase difference of 90°. However, for example, the following construction may be used. That is, the pulse signal is generated from one of the signal lines 82a when the piston rod 48 advances in the direction of the arrow A, while the pulse signal is generated from the other signal line 82b when the piston rod 48 advances in the direction of the arrow B.

Further alternatively, the cylinder 58 may be provided with an encoder. The output of the encoder may be connected to a counter which is constructed in the same manner as the counter 70 according to the embodiment of the present invention. By doing so, it is possible to shorten the step effected by the cylinder 58 by controlling the cylinder 58 in the same manner as described above, making it possible to further improve the production efficiency.

What is claimed is:

1. A counter for counting a number of pulses of a pulse signal outputted from an encoder, comparing said number of pulses with a preset count value, and outputting a coincidence signal if said number is substantially coincident with said preset count value, said counter comprising:

a time-measuring section for measuring an elapsed time from said output of said pulse signal during a period until the next pulse signal is outputted; and a signal output section for comparing said elapsed time with a preset time and outputting a preset time elapse signal at a point of time at which said elapsed time arrives at said preset time.

2. The counter according to claim 1, wherein said encoder is connected to an actuator, and said preset count value is set for a desired operation state of said actuator.

3. The counter according to claim 2, wherein said actuator is a cylinder.

4. The counter according to claim 1, wherein said encoder is connected to an actuator, said preset count value is set as a plurality of individuals for desired operation states of said actuator, and said coincidence signal is outputted for each of said plurality of preset count values.

5. The counter according to claim 1, further comprising a clock signal-generating section, wherein said time-measuring section measures said elapsed time by counting a number of clock signals supplied from said clock signal-generating section.

6. The counter according to claim 1, wherein said time-measuring section resets said elapsed time to perform measurement every time when the pulse signal is outputted.

7. The counter according to claim 1, further comprising:

a counting section for counting said number of pulses of said pulse signal;

a preset count value-storing section for storing said preset count value; and a comparing section for comparing said preset count value with said number of pulses, wherein:

said comparing section outputs said coincidence signal if said number of pulses is substantially coincident with said preset count value.

8. The counter according to claim 7, further comprising a preset allowable value-storing section for storing a preset allowable value for said preset count value, wherein said comparing section outputs said coincidence signal if said number of pulses is substantially coincident with said preset count value which is set within a range of said preset allowable value.

* * * * *